March 9, 1943.  H. L. WALLS  2,313,105
APPARATUS FOR TIGHTENING AIRPLANE PROPELLER SHAFT THRUST BEARING NUTS
Filed July 25, 1941  2 Sheets-Sheet 1

INVENTOR
HERBERT L. WALLS
ATTORNEYS

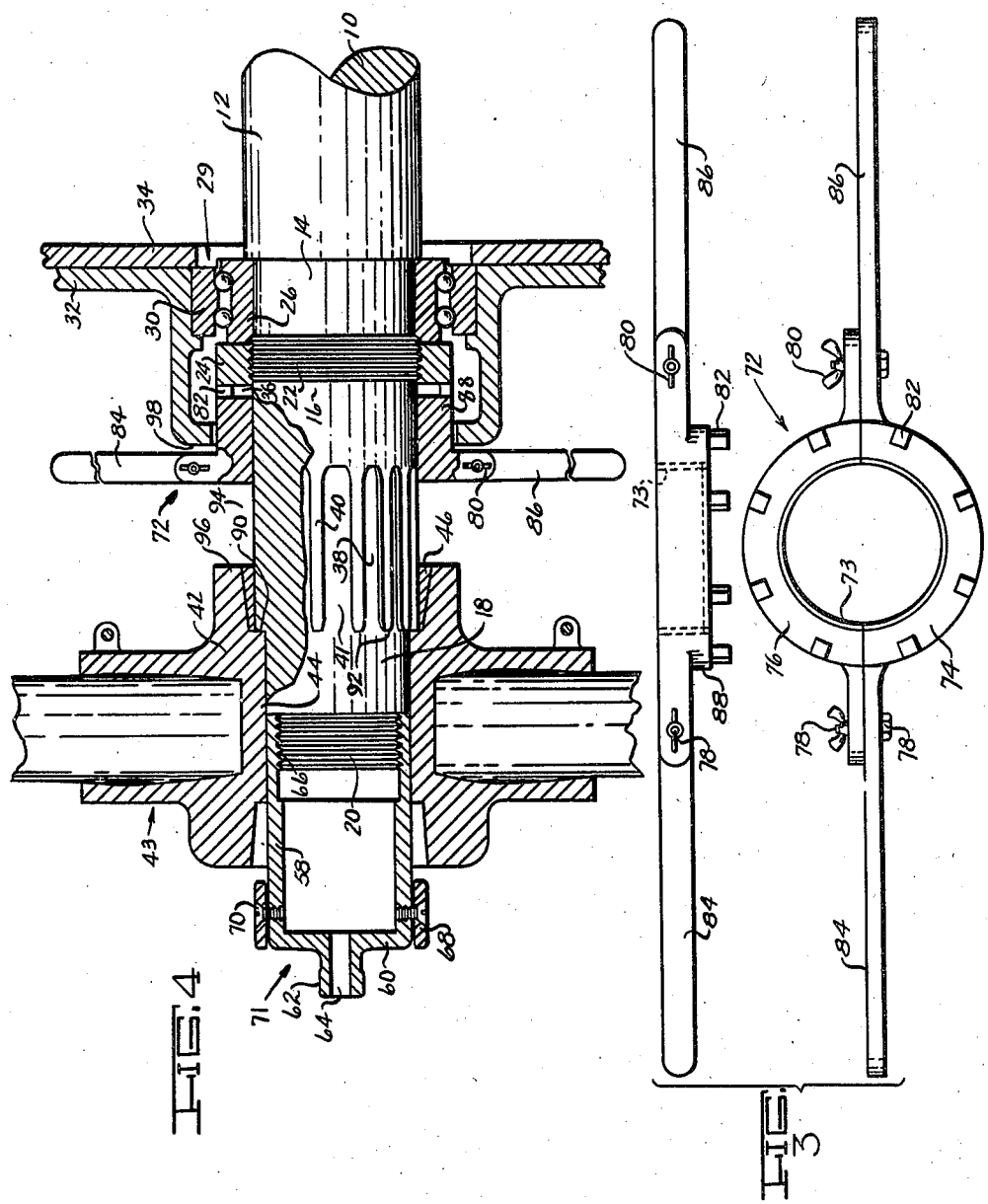

Patented Mar. 9, 1943

2,313,105

UNITED STATES PATENT OFFICE 2,313,105

APPARATUS FOR TIGHTENING AIRPLANE PROPELLER SHAFT THRUST BEARING NUTS

Herbert L. Walls, Salt Lake City, Utah

Application July 25, 1941, Serial No. 404,029

4 Claims. (Cl. 29—84)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to special apparatus for tightening the end thrust bearing clamp nuts of airplane propeller shafts.

United States Government regulations require an inspection of propeller thrust bearings at relatively close intervals for tightness of the clamp nut, and since this inspection has heretofore been performed only with considerable difficulty, it is an object of this invention to provide apparatus whereby this work may be accomplished in less time, with less trouble, and with less danger of injury to the mechanism and to the mechanic making the inspection.

Other objects and advantages will be seen as the invention and the manner in which it is used are described in detail and with reference to the drawings, wherein:

Fig. 3 shows a wrench which is another part of the tightening apparatus.

Fig. 4 is an assembled view of the tightening apparatus in place on a propeller shaft, the thrust bearing nut of which is being tightened.

Like reference characters refer to like parts throughout the drawings.

Figure 1:
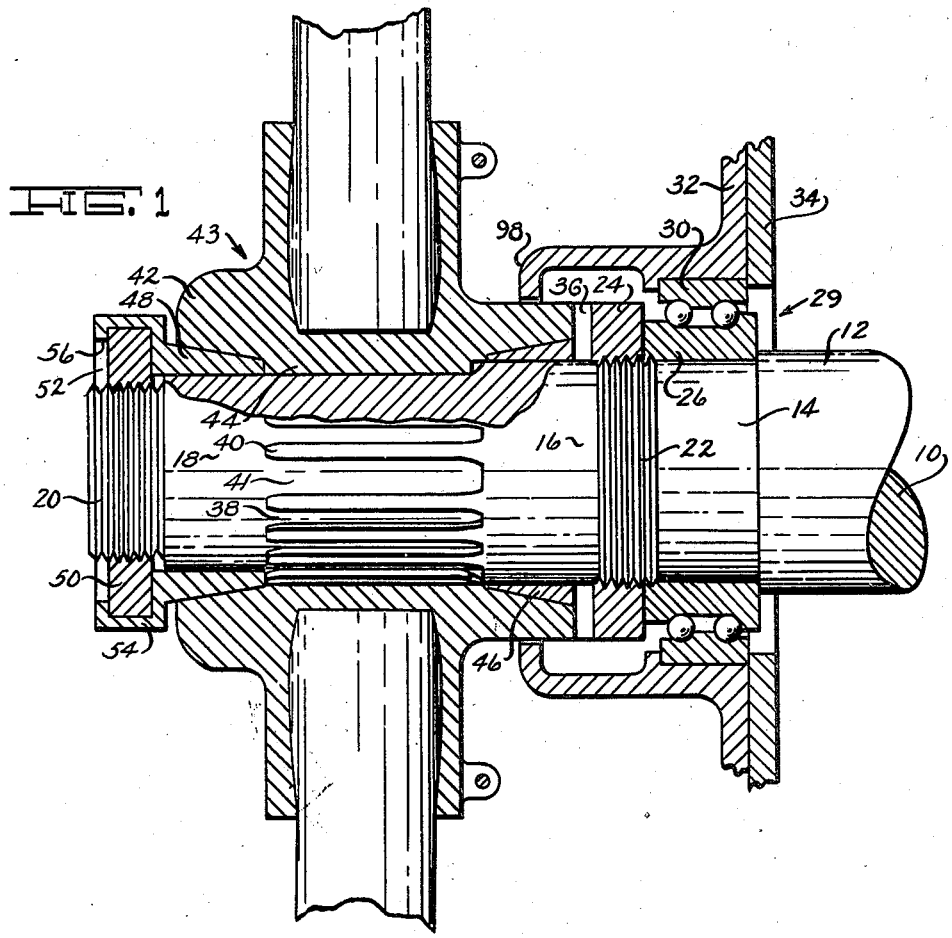
Fig. 1 is an axial section through a propeller shaft, propeller hub, thrust bearing, and bearing clamp nut, all in the operative position.

Referring more especially to Fig. 1, a propeller shaft 10 is progressively stepped in size, thereby providing different diameters at 12, 14, 16, 18 and 20.

The forward end of part 14 carries the external threads 22 over which corresponding internal threads of the nut 24 are fitted, whereby the inner race 26 of a combined radial and thrust bearing 29 is drawn tight on the shaft, the outer race 30 being held against axial movement between the two parts 32 and 34 of the engine. The nut 24 has spanner slots 36 in its forward face whereby it may be rotated for clamping the thrust bearing inner race.

The forward end of part 16 has a series of splines 40 which are formed by cutting a series of equal grooves 38 and one wider groove 41. The hub 42 of the propeller 43, has a series of internal splines 44 which fit slidably into the grooves 38, and one wider internal spline (not shown) which fits into the wider groove 41. With this arrangement, the propeller and shaft may be assembled only when the shaft and hub are in a given rotative position with respect to each other.

Parts 16 and 18 are ground with extreme regard for concentricity with each other and with the axis of rotation and are provided respectively with split cones 46 and 48 which fit conical counterbores in the ends of the hub 42, the internal splines 44 of the hub being located between the two counterbores. With such an arrangement, no extremely accurate fit need be had between the external splines 40 and internal splines 44, since concentricity between hub 42 and shaft 10 is maintained by the cones 46 and 48.

The nut 50 on the externally threaded part 20 is adapted to force the cone 48 toward the cone 46 to thereby clamp the hub 42 against axial movement as well as in concentric relation with the shaft. Spanner wrench slots 52 are provided in the front face of the nut to facilitate adjustment. Cone 48 has a cylindrical portion 54 which surrounds the nut 50 and closes in around the front face as at 56 whereby the cone 48 may be pulled from the assembly by the nut when so desired. Nut 50 serves also as a lock nut for the nut 24 after the nut 24 is tightened.

Prior to the present invention, whenever it became necessary to inspect and tighten the nut 24, the procedure was substantially as follows:

First, the nut 50 was removed, pulling the cone 48 with it. The propeller 43 was then moved forward to a position near the end 20 of the shaft, and a hoist attached thereto. It was then necessary to swing the propeller clear of the shaft and move it out of the way, and it frequently happened that it was dragged over the threads 20, burring or otherwise marring them.

With the propeller thus entirely removed, the cone 46 could be slipped off and laid aside, and a spanner wrench slipped over the shaft to engage the notches 36 and adjust the nut 24. When the tightening operation was completed the reverse procedure was employed, the cone 46 being returned, the propeller being swung on to the end of the shaft with the hoist and the cone 48 and nut 50 returned to their former position.

Figure 2:
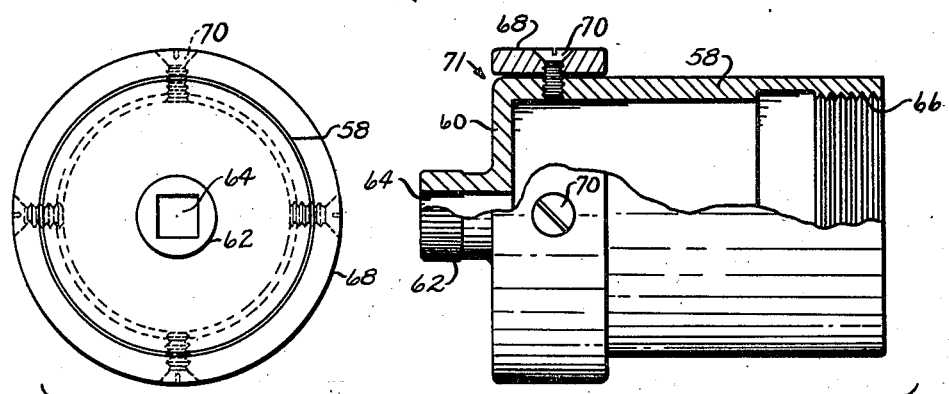
Fig. 2 shows a cylindrical member which constitutes part of the tightening mechanism which is the subject matter of the invention.

The apparatus provided to improve the above procedure is shown in Figs. 2 and 3. Referring to Fig. 2, a cylinder 58 has the end closed as at 60, and a short knurled handle 62 is formed on the closed end, a square opening 64 in the handle 62 being provided within which a wrench may be inserted when it is desired to exert more turning effort on the cylinder than may be done by hand. The open end is internally threaded as at 66 to fit freely over the threaded end 20 of the propeller shaft. The outer diameter of the cylinder 58 should be the same as, or very slightly less than, the outer diameter of the part 18 of the shaft, so that the splines 44 on the inside of the propeller hub, which slide over the part 18, may also slide over the cylinder 58. A removable collar 68 is slidable freely over the cylinder 58 and is held thereon by screws 70. The parts which are separately numbered 58, 60, 62, 64, 66, 68 and 70 may collectively be referred to as the adapter 71.

Referring to Fig. 3, a spanner wrench 72 is made in two parts 74 and 76 which are held together by bolts 78 and wing nuts 80. Lugs 82 are formed on the faces of parts 74 and 76, the size and circumferential spacing of the lugs corresponding respectively to the size and circumferential spacing of the slots 36 of the nut 24 which the wrench is adapted to tighten.

The part 74 is prolonged at 84 and 86 to form handles for the wrench 72. The annular part 88 upon which the lugs 82 are formed is in the form of a hub which extends axially beyond the plane of the handles. Since the wrench 72 is preferably made of steel and hardened, liners 73 may be secured in the hubs, the liners being made of softer material to prevent marring of the shaft splines 40 or other accurately machined surfaces.

The procedure for applying the improved apparatus herein disclosed and tightening the thrust bearing nut is illustrated in Fig. 4 and may be described as follows:

First the nut 50 is removed, pulling the cone 48 with it. The adapter 71 is then put into position by screwing its internal threads 66 over the external threads 20 of the propeller shaft. The propeller 43 is then pulled forward until the front face of its hub 42 is against, or substantially against, the collar 68 of the adapter.

In proportioning the adapter 71, care should be taken that the collar 68 is so located on the cylinder 58, that when the propeller is pulled forward as above indicated, that is, until the front face of the hub 42 strikes the collar 68, the rear ends 90 of the internal splines 44 in the propeller hub will clear the front ends 92 of the external splines 40 of the propeller shaft.

When the collar 68 is located as above stated, and the propeller 43 has been pulled forward as suggested, that is, until the hub 42 abuts the collar 68, the internal and external splines 40 and 44, will be clear of each other, and the propeller may be rotated somewhat, preferably 180 degrees to bring the wider groove 41 safely out of alignment with its wider spline in the hub 42. A space 94 will now have been made for adjusting the nut 24, yet the propeller will have been confined to a position where it may not slide axially in either direction to the injury of the workman or the accurately machined parts of the hub or the shaft.

The wrench 72 is now applied by first removing the wing nuts 80, so that the two parts 74 and 76 of the wrench may be separated, then placed around the shaft and reassembled in a position close to the end 96 of the propeller hub 42, then moved axially rearward until the lugs 82 of the spanner enter the notches 36 of the nut 24. The hub 88 of the spanner wrench should not be too long to allow the lugs 82 to clear the face 98 of the engine part 32 when the spanner is moved axially forward against the face 96 of the propeller hub 42.

With the special wrench 72 now assembled and in place as shown in Fig. 4, the nut 24 may be inspected, and if necessary tightened, but since the proper tightening of the nut 24 involves the application of considerable torque to the nut, some means for holding the shaft 10 from turning must be provided.

A means to hold the shaft 10 from turning may consist of a spline wrench, which may be put on the splines 40 with the wrench handle extending horizontally and with a proper weight on the end of the handle. When such a spline wrench and weight are used, the special wrench 72 is merely turned until the weight on the spline wrench handle rises, whereupon the nut 24 will be at the proper tightness.

If a suitable spline wrench is not available, the propeller may be used instead, in which case the procedure is as follows:

After the special wrench 72 has been assembled in place as in Fig. 4, the propeller is rotated by hand until the external and internal splines 40 and 44 are realigned, whereupon the propeller may be pushed rearwardly until the end 96 of its hub is against the face of the special wrench. In this position the propeller acts as a spline wrench for holding the shaft 10 from rotating when the nut 24 is tightened. In order to insure the proper degree of tightening in this case, the propeller may be blocked on the maintenance stand and proper pressure applied to the special wrench by any suitable means of measurement. Care must, however, be taken when so blocking the propeller blades to prevent marking or scoring. A sponge rubber pad or a pad of any other suitable soft material may be inserted between the propeller and the stand to accomplish this purpose. After tightening the nut 24 the special wrench parts must be disassembled and removed, but before removing them it should be made certain that the protection against injury to the workman, which the use of the adapter 71 affords, has been made available. If the propeller has been used as a spline wrench, it should first be moved forward until it touches the collar 70, then rotated to misalign the splines 40 and 44 to prevent it sliding rearward and injuring the workman while he is disassembling the special wrench. After the special wrench is removed, the propeller is again rotated until the large spline and its slot become aligned, the propeller pushed rearward on the shaft until the cone 46 touches the front face of the nut 24, the adapter 71 removed, then the nut 50 and cone 48 put back into place. If during or after the operation of tightening the thrust bearing nut, it should for any reason become desirable to completely remove the propeller, this can readily be done by removing the screws 70 and collar 68, whereupon the propeller will slide off over the cylinder 58 without danger of injury to the threads 20 of the shaft 10.

From the foregoing description it will be obvious that, in using the device disclosed for tightening the thrust bearing nut, considerable time is saved and danger of personal injury avoided by not having to remove the propeller, while considerable advantage is also had by obviating the danger of injury to the shaft threads in its removal, and since the thrust bearing inspection is usually made with the axis of the propeller shaft at an angle, the front end being higher, a considerable safety factor results from so limiting axial movement of the propeller during tightening of the bearing nut that the propeller may not slide axially and crush the hands of the mechanic making the inspection.

Having thus described an embodiment of the invention, I claim:

1. Apparatus for use in the operation of inspecting and tightening airplane propeller thrust bearings, wherein the propeller shaft has threads provided with a nut near the back end for clamping said thrust bearing, has threads provided with a nut at the front end for holding said propeller against forward movement and has external splines on said shaft intermediate said threads for driving said propeller, and wherein said propeller has internal splines fitting between said external splines, said apparatus comprising, in combination, an internally threaded cylindrical adapter for screwing over the said front end thread when the nut is removed therefrom, said cylindrical adapter having an outside diameter enough smaller than the inside diameter of said propeller splines that said propeller may be slid axially upon said adapter, and a collar so constructed and located on the outside of said adapter that when it arrests forward axial movement of said propeller the back ends of said propeller splines will have slightly passed the front ends of the shaft splines, whereby the propeller may be rotated to misalign the two sets of splines to prevent the propeller moving rearwardly, during an inspecting and tightening operation.

2. The structure of claim 1 with removable means holding said collar on said cylindrical adapter, whereby said collar may be removed and said propeller may be removed over said cylindrical adapter.

3. Apparatus for use in the operation of tightening airplane propeller thrust bearing nuts, wherein the propeller shaft has threads provided with a nut near the back end for clamping said thrunt bearing, has means at the front end for holding the propeller against forward movement, and has external splines intermediate the ends for driving the propeller, and wherein said propeller has internal splines extending between said external splines, said apparatus comprising, in combination, a cylindrical adapter for attaching to the front end of said shaft, said adapter having an outside diameter enough smaller than the inside diameter of said propeller splines that said propeller may slide axially upon said adapter, and a collar on the outside of said adapter formed and positioned to arrest forward movement of said propeller when the back ends of the propeller splines have just passed the front ends of the shaft splines, whereby the propeller may be rotated to misalign the two sets of splines to prevent its moving axially, during a tightening operation.

4. The structure of claim 3 with screws detachably holding the collar on the adapter.

HERBERT L. WALLS.